June 13, 1944.  D. W. MOLINS ET AL  2,351,533
WEIGHING MECHANISM
Filed Jan. 3, 1941  2 Sheets-Sheet 2
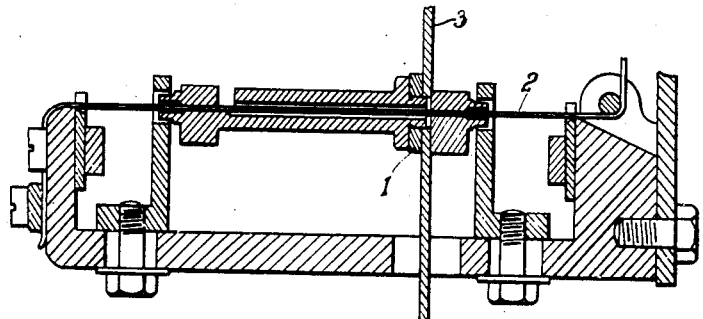
Fig. 2.
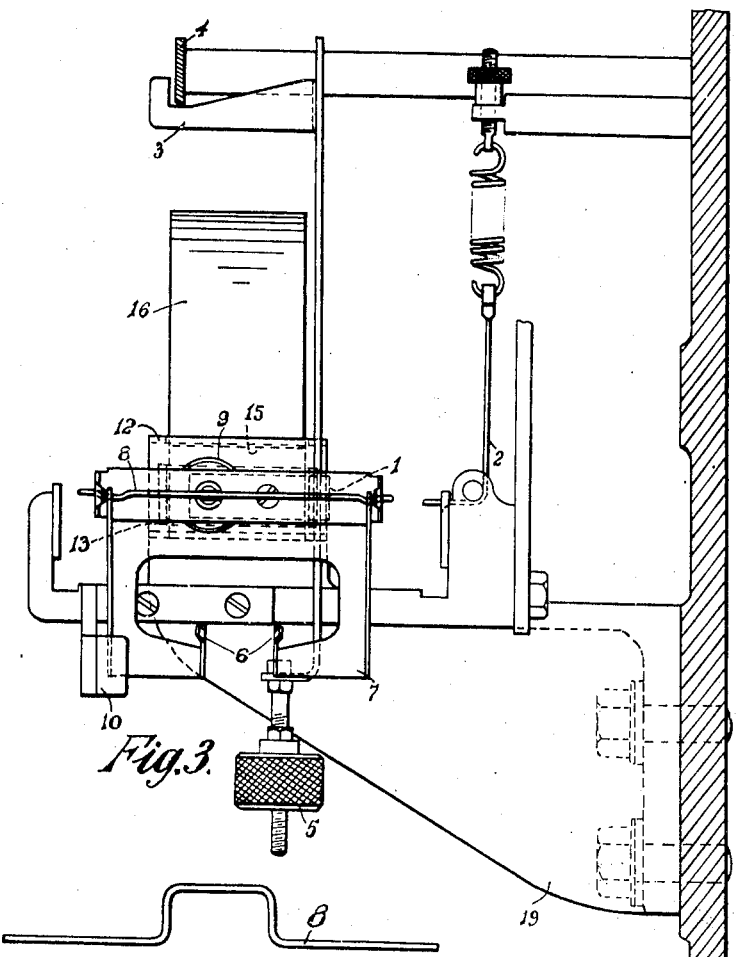
Fig. 3.
Fig. 4.
Inventors
D. W. Molins, L. Best, H. J. Powell
By Watson, Cole, Grindle & Watson
Attys Patented June 13, 1944

2,351,533

UNITED STATES PATENT OFFICE 2,351,533

WEIGHING MECHANISM

Desmond Walter Molins, Cyril Best, and Gordon Francis Wellington Powell, Deptford, London, England, assignors to Molins Machine Company, Limited, Deptford, London, England Application January 3, 1941, Serial No. 373,052
In Great Britain January 4, 1940

5 Claims. (Cl. 265—27)

This invention is for improvements in or relating to weighing mechanism, and is concerned with weighing mechanisms intended to effect a succession of weighing operations at a high speed.

In previous proposals, weighing mechanisms arranged to operate at a high speed have been provided with vanes carried by the weigh beam and arranged to move in an oil bath, thus providing a damping effect. It has also been proposed in prior British Patent Specification No. 13,526 of 1907 to damp the oscillation of the weigh beam by means of a coil or conductor loop swinging in a magnetic field.

In co-pending United States application Serial No. 293,862 now Patent No. 2,220,544, there is described and claimed a construction in which the damping of the weigh beam is effected by a conductor loop which oscillates in a magnetic field about an axis concentric with that of the oscillation of the weigh beam, the loop being symmetrically disposed about the axis of oscillation. That construction is found to be rapid, and in practice it has been found possible to effect 50 weighing operations by that device per minute. That construction, however, as also the construction in British Patent Specification No. 13,526 of 1907, makes it difficult or sometimes impossible to weigh paramagnetic objects, owing to the magnetic attraction set up by the means for providing the magnetic field for effecting the damping.

It is an object of the present invention to provide a weighing mechanism which is capable of weighing paramagnetic objects and also retain the advantages of rapid damping obtainable by a loop conductor in a magnetic field. At the same time, of course, it is desirable that the weigh beam should not be unnecessarily heavy, otherwise there is a loss in speed of weighing.

According to the present invention there is provided a weighing mechanism, comprising a pivoted weigh beam, a support for an article to be weighed, said support being located to one side of the pivot for the weigh beam and connected with the weigh beam for movement therewith, and a conductor loop made of material having a low electrical resistance movable with the weigh beam and located on the opposite side of said pivot, the loop being movable in a magnetic fields. The conductor loop may comprise a counterweight for the loaded weigh beam.

Weighing mechanisms according to the present invention are preferably, but not necessarily, mechanisms having a scale calibrated in such a way that articles of the right or correct weight will, when counter-balanced by the beam with its conductor loop, take up a neutral position, and that articles that are heavier or lighter than the correct weight will cause the beam to swing by an amount proportionate to the excess or deficiency in weight to one side or the other of this neutral position. Thus the weigh beam itself can be constructed as lightly as practicable, whilst the conductor loop is formed of a material having good conductive properties, such for example as copper. Thus whilst the weigh beam itself may be made of a light aluminium alloy, the heavier material of the conductor loop is employed as a counterweight to the scale pan and the article to be weighed, and consequently the mass of the weigh beam and the parts carried by it may be maintained at a minimum. The term "conductor loop" is employed herein to distinguish a device constructed in accordance with the invention from a device having an armature other than a loop or coil and which, when moved in a magnetic field, produces only eddy currents.

One embodiment of the invention will be described, by way of example, with reference to the accompanying drawings, in which:

Figure 2 is a section of Figure 1 on the line A—A showing the method of suspending the beam.

Figure 3 is an end elevation of Figure 1.

Figure 4 is a plan of a detail shown in Figures 1 and 3.

Like reference numerals refer to like parts throughout the specification and drawings.

Figure 1:
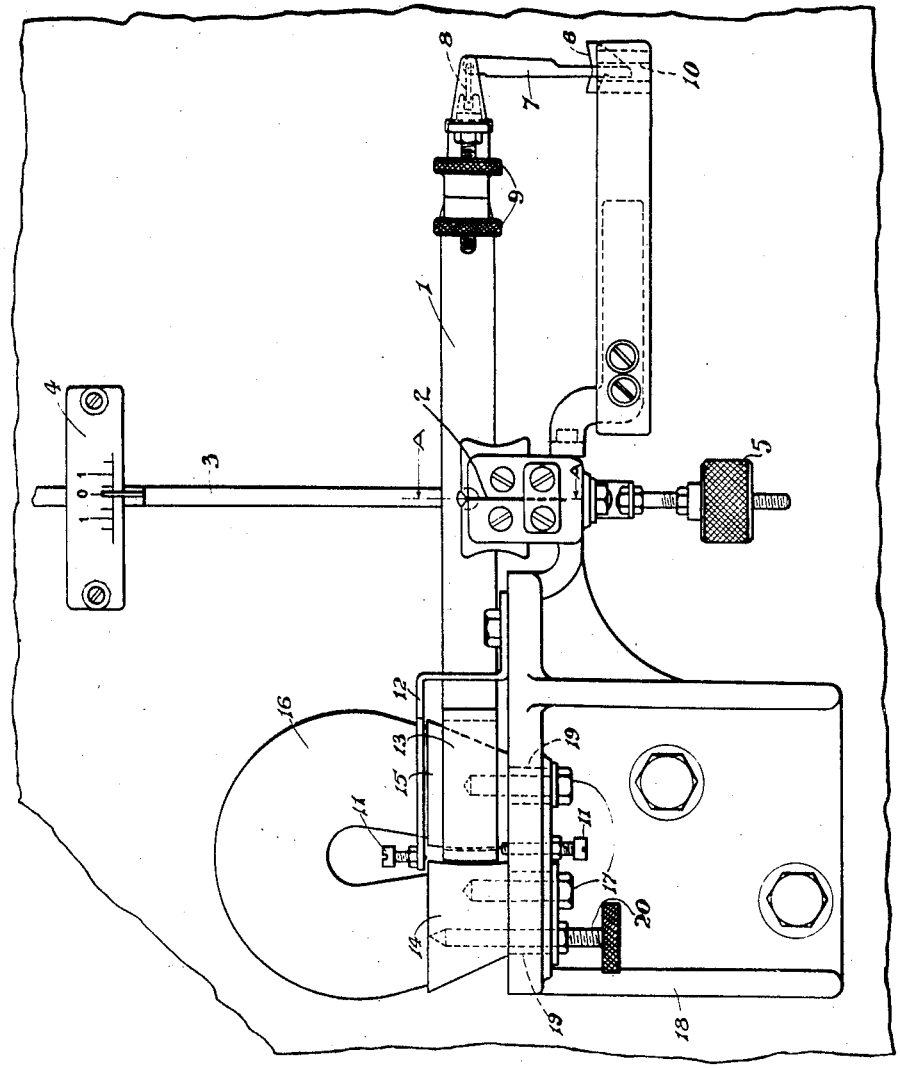
Figure 1 is a front elevation of a weighing mechanism constructed according to the invention.

Referring to the drawings, the weigh beam 1 consists of a single arm and is suspended on a taut wire 2 which comprises a pivot about which the beam can turn. A pointer 3 is provided and moves over a calibrated scale 4 and is counterbalanced by an adjustable weigh 5. An article which is to be weighed is supported by a scale pan which comprises a pair of inverted V-shaped supports 6 formed in a pivoted member 7. As the member 7 is made of thin and rather flexible material the pivot for suspending it consists of a stiff Fescolised bronze wire 8, see Figures 1, 3 and 4, which is bent as shown in Figure 3 to reduce friction and prevent accidental displacement of the pan. The end of the beam near the pan is provided with a counterweight comprising two adjustable nuts 9, and when the apparatus is set up these nuts, and if necessary the nut 5, are adjusted until a zero reading on the scale is obtained with an article of correct weight in the pan. The beam, the scale pan and its support are all of non-magnetic material to obtain the maximum advantage of the location of the magnetic damping device referred to below.

A grooved guide 10 is provided which surrounds one end of the member 7 and restricts the movement of the pan during the transfer of articles to and from the pan. This transfer may be effected in any suitable manner and is not pertinent to the present invention.

When the mechanism is employed for automatic weighing it may happen that by accident an extremely light article or an extremely heavy article is transferred to the pan, and as the machine is balanced at zero for an article of correct weight it will be seen that in either case damage may be caused to the machine. To prevent this, stops comprising adjustable screws are provided, the upper screw 11 being supported by a yoke 12 which embraces one of the pole pieces referred to below.

The weigh beam 1 which is made of a light aluminium alloy is provided with a copper conductor loop 13 and the latter is located, as can be seen from Figure 1, to one side of the pivot 2 while the scale pan 6 is on the opposite side of the pivot 2. The conductor loop is arranged to effect a balance of the weigh beam when an article of correct weight is being weighed, so that the beam takes up a neutral position as indicated by the pointer 3 moving over the scale 4. The loop is arranged between two pole pieces 14 and 15 having an air gap which is variable as described below so as to control the amount of damping, and on these pole pieces is placed a permanent magnet 16 made from a known aluminium iron alloy. The air gap is adjusted by moving the pole pieces as necessary by unclamping the bolts 17 after which the pole pieces may be slid along the support bracket 18 which is slotted at 19 to permit the bolts to be moved. In order further to adjust the magnetic field, provision is made for tilting the permanent magnet by a screw 20. Alternatively the adjustment could be made by twisting the magnet about a vertical axis or by sliding it along the pole pieces so as to reduce the magnetic flux.

What we claim as our invention and desire to secure by Letters Patent is:

1. In weighing mechanism, a pivoted weigh beam, a support for an article to be weighed connected with the weigh beam for movement therewith and located on one side of the weigh beam pivot, a conductor loop made of material having a low electrical resistance located on the opposite side of said pivot and means for producing a magnetic field, said loop being movable with the weigh beam and in said field in a direction such as to induce current flow around said loop.

2. In weighing mechanism, a pivoted weigh beam, a support for an article to be weighed connected with the weigh beam for movement therewith and located on one side of the weigh beam pivot, a conductor loop made of material having a low electrical resistance located on the opposite side of said pivot and means for producing a magnetic field, said loop being fixed to the weigh beam and movable in said field in a direction such as to induce current flow around said loop.

3. In weighing mechanism, a pivoted weigh beam of light structure, a support for an article to be weighed connected with the weigh beam for movement therewith and located on one side of the weigh beam pivot, a conductor loop made of material having a low electrical resistance located on the opposite side of said pivot and means for producing a magnetic field, said loop being movable with the weigh beam and in said field in a direction such as to induce current flow around said loop, the mass and location of the loop being such as to form a counter-poise for the beam when an article of correct weight is in said support.

4. In weighing mechanism, a pivoted weigh beam of light structure, a support for an article to be weighed connected with the weigh beam for movement therewith and located on one side of the weigh beam pivot, a conductor loop made of material having a low electrical resistance located on the opposite side of said pivot and means for producing a magnetic field in a direction such as to induce current flow around said loop, said loop being fixed to the weigh beam and movable in said field, the mass and location of the loop being such as to form a counterpoise for the beam when an article of correct weight is in said support.

5. In weighing mechanism, a pivoted weigh beam of light structure, a support for an article to be weighed connected with the weigh beam for movement therewith and located on one side of the weigh beam pivot, a conductor loop made mainly or wholly of copper located on the opposite side of said pivot and means for producing a magnetic field, said loop being fixed to the weigh beam and movable in said field in a direction such as to induce current flow around said loop.

DESMOND WALTER MOLINS.
CYRIL BEST.
GORDON FRANCIS WELLINGTON POWELL.